Patented Sept. 28, 1943

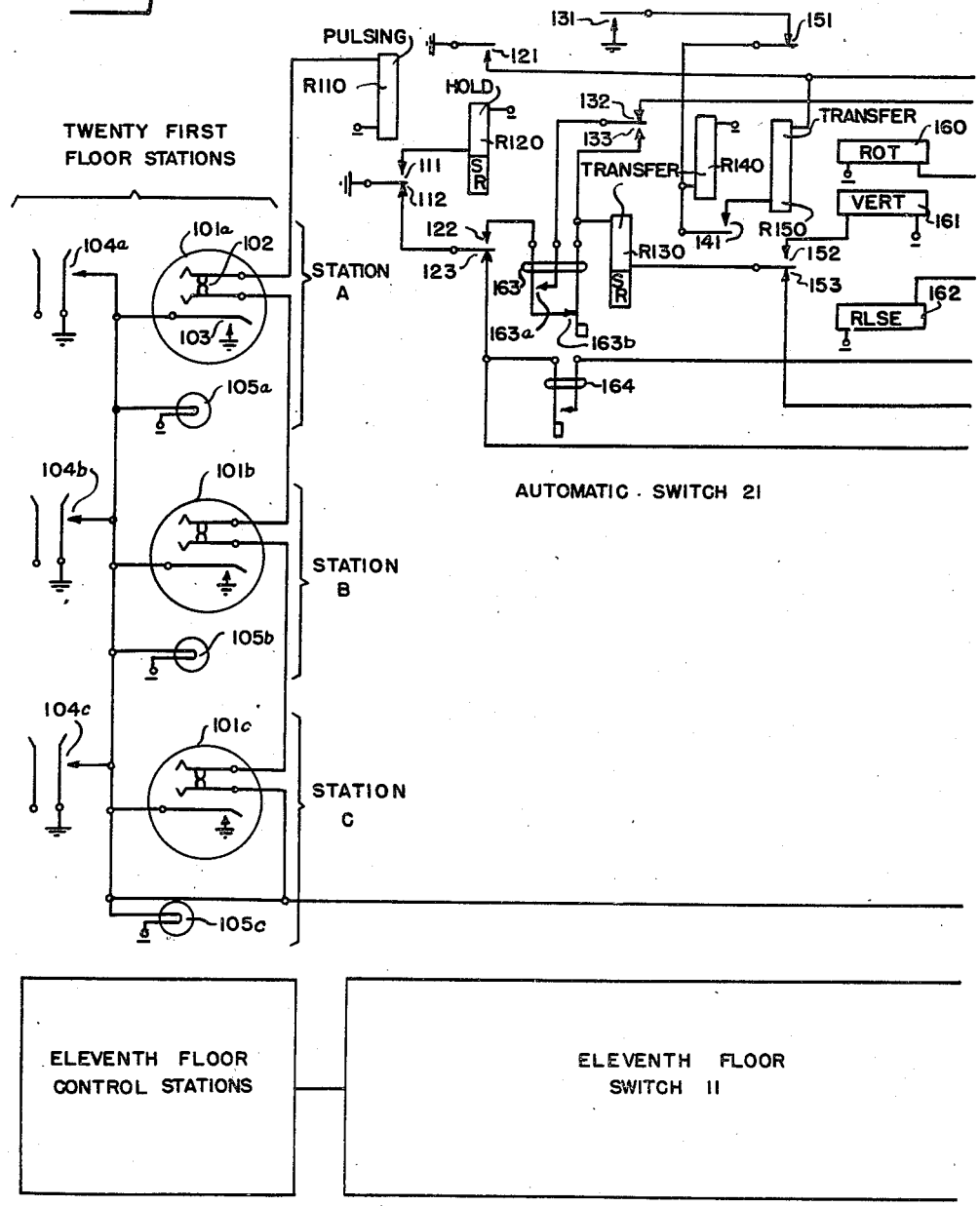

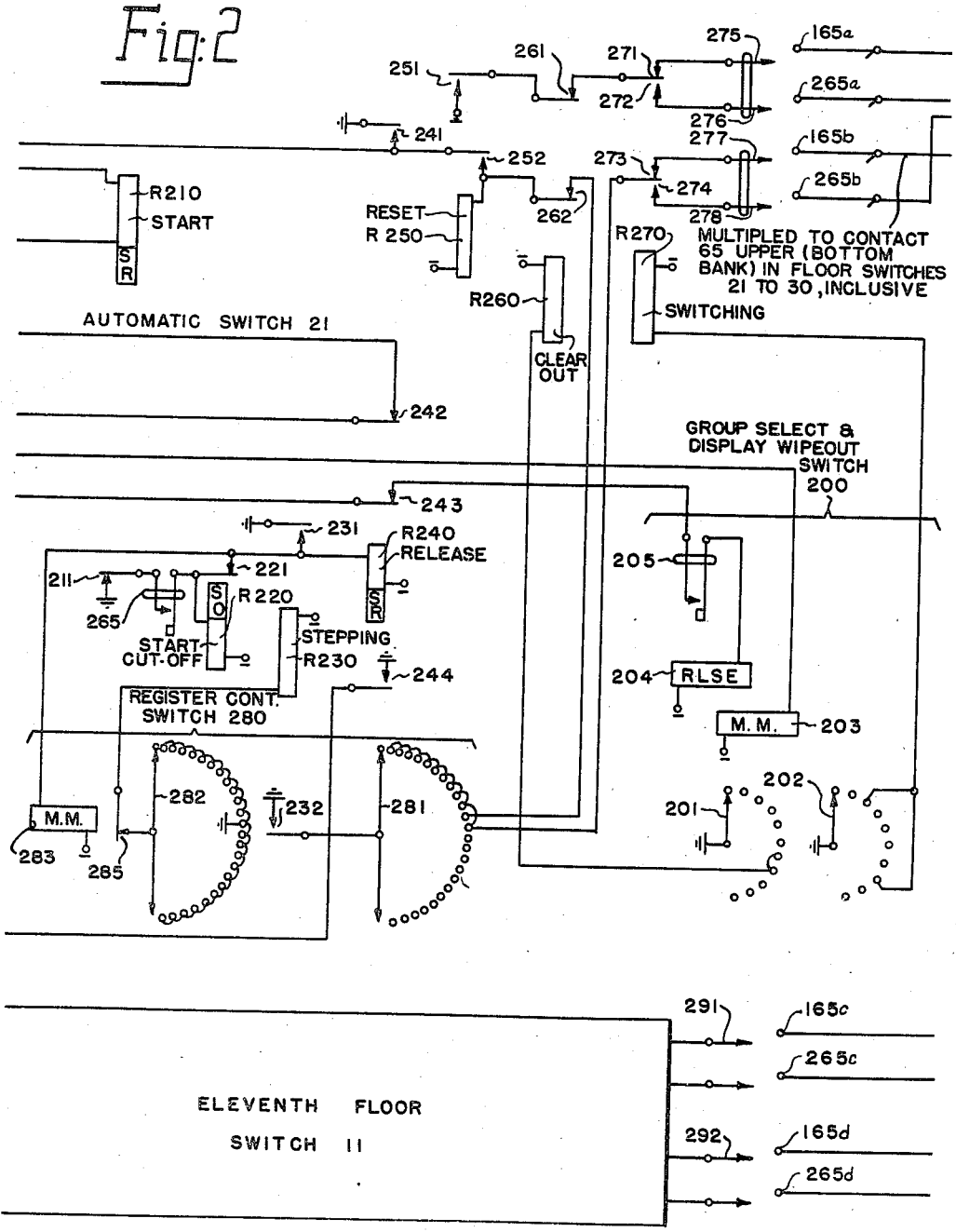

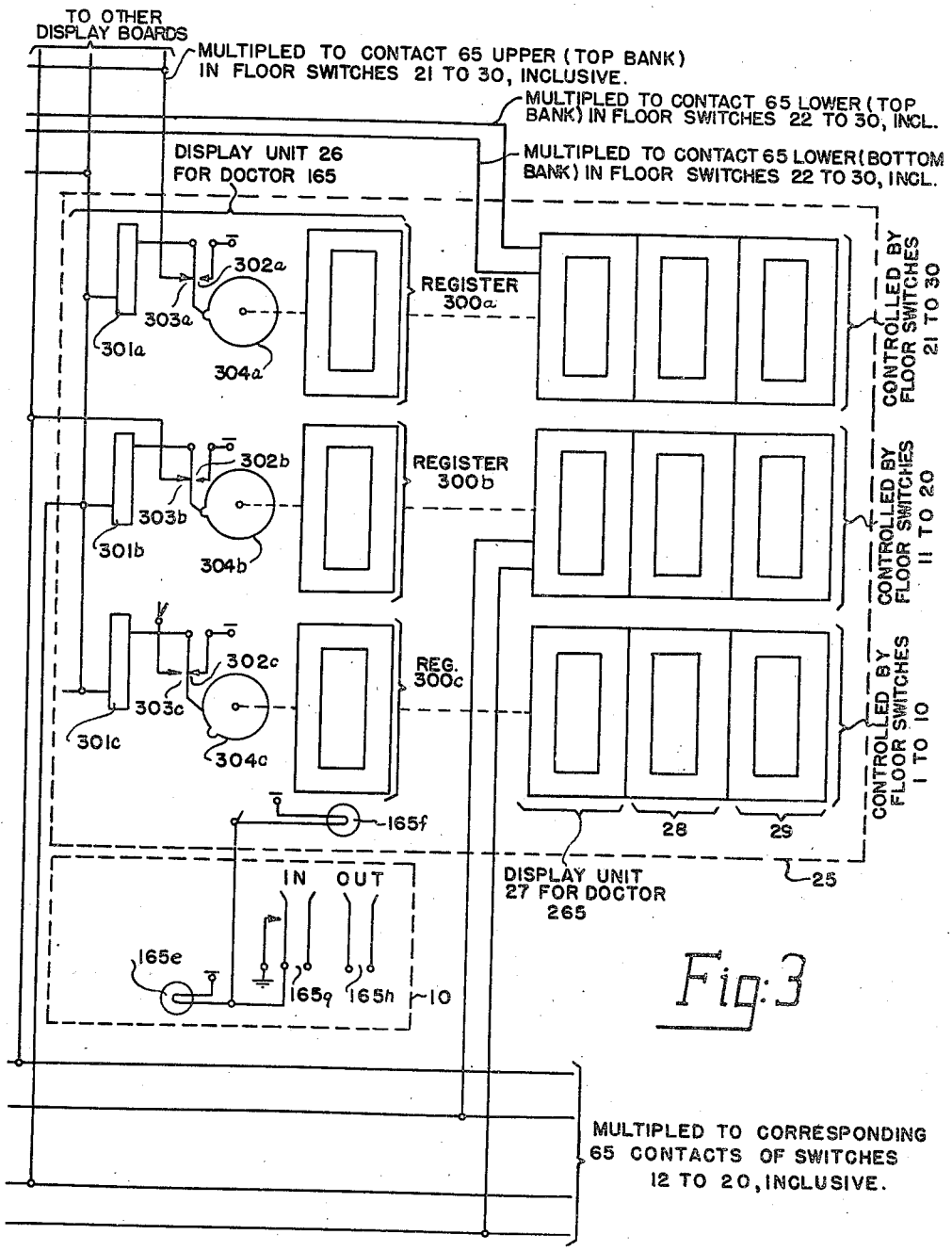

2,330,356

UNITED STATES PATENT OFFICE 2,330,356

INDICATING SYSTEM

Alfred H. Belliveau, Chicago, Ill., assignor to Automatic Electric Laboratories, Inc., a corporation of Delaware Application April 26, 1941, Serial No. 390,624

13 Claims. (Cl. 177—353)

The present invention relates to systems for indicating the location of one or more persons or objects which may be located in different zones of a plural zone area, and more particularly to improvements in systems for providing accurate information as to the whereabouts of a large number of doctors who may be working on the different floors of a large hospital. An improved system of this character is disclosed and claimed in the co-pending application Serial No. 390,621, filed April 26, 1941, Harry E. Hershey, which is assigned to the same assignee as the present invention, and the present invention relates to improvements thereover. In the system disclosed in the Hershey application, a display board is provided on each floor of the hospital and each board includes display units or sections individual to the doctors attached to the hospital staff. Each display unit is equipped with lamps which may be selectively energized to give an indication as to the floor where the corresponding doctor is located. The sets of display units individual to the various doctors are selectively controllable through automatic switches individual to the various floors from control stations conveniently located on the floors, to indicate the floors on which the respective corresponding doctors may be located. Although the system is simple in arrangement, fully satisfactory in operation, and includes several improved and novel operating features, it requires a group of several control relays for each doctor whose name is posted on the display boards and, hence, the display board equipment thereof is somewhat expensive to manufacture and install.

Accordingly, it is an object of the present invention to provide an improved system of the character described which is so arranged that the display board equipment is reduced to a minimum.

It is another object of the invention to provide an improved system of the character described which is so arranged that electro-magnetically operated display registers of limited indicating capacity may be utilized in sets of two or more in each display unit to provide the required number of zone or floor indications.

In the illustrated embodiment of the invention each display unit is comprised of a plurality of pulse-controlled electro-magnetically operated display registers, each of which includes an indicating element having ten floor display positions and a normal or blank position. In order to control the operating magnet of a selected register in a selected display unit, each automatic floor switch is equipped with means for transmitting a train of restoring pulses to the magnet, thereby to drive the indicator of the selected register to its blank position, and to then transmit to the magnet a train of reset pulses which identifies, by the number of pulses thereof, the location of the control station from which the selected display register is being controlled. More specifically, the display registers of each unit are each individual to a group of ten floors of the hospital and are only controllable through the floor switches on these floors to give indications identifying the associated floors. Provisions are made, however, whereby each train of restoring pulses is transmitted to the operating magnet of each register in a selected unit, thus ensuring that conflicting indications will not be posted on the display boards. Provisions are also made in the floor switches, whereby these switches may selectively be controlled from the associated control stations to limit the pulse transmission to restoring pulse trains only, thus providing a vehicle whereby an existing indication may be wiped out in a selected unit without posting a new indication in the unit.

The novel features believed to be characteristic of the invention are set forth with particularity in the appended claims. The invention, both as to its organization and method of operation, together with further objects and advantages thereof, will best be understood by reference to the specification taken in connection with the accompanying drawings in which Figs. 1, 2 and 3, when laid side by side in the order named, illustrate a portion of the equipment provided in a system which includes the features of the invention briefly outlined above.

Referring now more particularly to the drawings, the system there illustrated comprises a plurality of display boards which are individual to the various floors of the hospital, and each of which is conveniently located for easy observation from any point in the corridor of the floor where it is located. One such display board is indicated at 25 as being provided on the first floor of the hospital. This display board comprises a plurality of display units 26, 27, 28, 29, etc., which individually correspond to the doctors whose locations are to be posted thereon. For example, the display unit 26 may be utilized to indicate the location of the doctor who is assigned the identification number 165, and the display unit 27 may be utilized to indicate the location of the doctor who is assigned the identification number 265. The various display boards are of identical arrangement and, as will appear more fully hereinafter, are so arranged that each set of units which corresponds to a particular doctor is controlled in unison. The individual units of the display board are also identical in arrangement. Briefly described, the display unit 26 comprises a pilot lamp 165*f*, which, when energized, indicates that the doctor No. 165 is somewhere in the hospital, and a plurality of floor indicating display registers 300*a*, 300*b* and 300*c*. These registers are of the well-known electro-mechanical type, as shown for example in Figure 22 of Patent No. 2,234,684, granted March 11, 1941, to Harold C. Robinson and Martin L. Nelson, and each thereof is provided with a display drum which may be rotated from a normal or blank position to any one of ten off-normal positions wherein ten different floor number indications are displayed. More specifically, the register 300c is individual to the first ten floors of the hospital, and the indicating drum thereof has inscribed around the periphery thereof the numerals 1 to 10, inclusive. The register 300b is individual to the eleventh to twentieth floors of the hospital, and the indicating drum thereof has inscribed around the periphery thereof the numerals 11 to 20, inclusive. Finally, the register 300a is individual to the twenty-first to thirtieth floors of the hospital and is equipped with an indicating drum having the numerals 21 to 30 inscribed around the periphery thereof. The indicating drum of each display register 300 is mounted on a drive shaft to which rotary movement is imparted, in one direction only, by an associated pulse-controlled operating magnet 301 through an associated ratchet and pawl or Geneva gear mechanism, not shown. The drive shaft also carries a cam 304 which is arranged to control associated commutating contacts 302 and 303, in the manner more fully described hereinafter.

The control of the various display boards is effected from control stations which are conveniently located throughout the hospital. More specifically, an "in" and "out" entrance zone station 10 is provided in the entrance zone or lobby of the hospital and each floor of the hospital is equipped with one or more control stations. Thus the twenty-first floor of the building is provided with three control stations A, B, and C, each of which includes a signal transmitting device 101, a hold key 104, and a pilot lamp 105. The hold keys 104 are of the well-known locking type. Each signal transmitting device 101 is of the dial-operated type, conventionally used in the substations of automatic telephone systems, and comprises a set of pulsing springs 102 and a set of off-normal springs 103. The lobby or entrance zone station 10 comprises a plurality of key controlled switches and pilot lamps individual to the doctors whose names are posted on the various display boards. More specifically, an "in" key, an "out" key, and a pilot lamp is provided for each of the doctors. Thus the control panel at the station 10 is equipped with an "in" key 165g, an "out" key 165h, and a pilot lamp 165e, which are for the individual use of the doctor having the identification No. 165. The keys 165g and 165h are mechanically interlocked so that the key 165g, when operated to its off-normal position, may be restored to normal through operation of the key 165h.

The selection and selective control of the registers included in the various display units of the display boards is effected through the provision of a plurality of automatic switches which are individual to the various hospital floors and can only be controlled from the control stations provided on the corresponding floors. Thus an automatic switch 21 is provided which has access to all of the registers provided on the display boards to display indications identifying the twenty-first to thirtieth floors of the hospital. This automatic switch may be controlled only from the control stations A, B, C, etc., located on the twenty-first floor. Another automatic switch 11, which is individual to the control stations of the eleventh floor, is also schematically illustrated in the drawings. The various automatic floor switches are substantially identical in circuit arrangement. Briefly described, the switch 21 comprises a two-motion switching mechanism of the well-known Strowger type which is equipped with four banks of contacts, each including one hundred contact points. The contacts making up this contact field are divided into ten levels of ten contact sets each and each of the four banks has associated therewith one of the four wipers 275 to 278, inclusive, which are carried by a wiper carriage structure of well-known construction and arrangement. For the purpose of elevating the enumerated wipers to a position opposite a desired level of bank contacts, and then rotating the same into engagement with a selected contact set of a selected level, rotary and vertical magnets 160 and 161 are included in the mechanism. The mechanism further comprises a release magnet 162 which, when energized, permits the wiper carriage structure to be returned to rotary and vertical normal; two sets of vertical off-normal springs 163 and 164 which are operated when the wiper carriage structure is moved to any vertical off-normal position, and a set of rotary off-normal springs 265 which are operated when the wiper carriage structure is rotated one step away from the rotary normal position thereof.

In order to control the various magnets of the Strowger switching mechanism and the operating magnets of the display registers provided on the various display boards, the automatic switch 21 is equipped with a minor switch 200 which functions as a group select and display-wipe-out switch, a rotary switch 280 which functions to transmit the trains of restoring and reset pulses to the selected register magnets, and a plurality of control relays. Briefly described, the minor switch 200 includes two sets of contacts having eleven points each; wipers 201 and 202 individually associated with the two contact sets; an operating magnet 203 for driving the wipers 201 and 202 from normal to any selected off-normal position; a release magnet 204 for returning the enumerated wipers to normal, and a set of off-normal springs 205 which are operated into engagement when the wipers of the switch are moved off normal. The register control switch 280 similarly comprises two sets of contacts having twenty-five points each; wipers 281 and 282 individually associated with the two contact sets, and an operating magnet 283 for driving the wipers 281 and 282 over the contacts of their respective associated contact sets. It will be understood that, since the switch 200 is of the well-known minor type, the wipers thereof are stepped one step each time the operating magnet 203 is energized. In the switch 280, on the other hand, the ratchet and pawl mechanism controlled by the operating magnet 283 is so arranged that the wipers 281 and 282 are only stepped when the magnet 283 is energized and then deenergized. The relay equipment of the automatic switch 21 includes a pulsing relay R110, a hold relay R120, three transfer relays R130, R140 and R150, a start relay R210, a start cut-off relay R220, a stepping relay R230, a release relay R240, a reset relay R250, a clear out relay R260, and a wiper switching relay R270. Of the enumerated relays, the relays R120, R130, R210 and R240 are of the well-known slow-to-release type, while the start cut-off relay R220 is of the conventional slow-to-operate type.

Current for energizing the register operating magnets, the control relays, the indicating lamps, the operating magnets of the minor and rotary switches, and the operating magnets of the Strowger switching mechanisms, is supplied from a common direct current source, the positive terminal of which is connected to a common bus conductor and to ground. The negative terminal of the source is connected to a common negative bus conductor which terminates the various relay, magnet and lamp terminals which are identified in the drawings by the negative polarity sign. For convenience in describing the circuits involved, this source of current, which may conventionally comprise a storage battery floated across the terminals of a charging rectifier, has not been shown.

In considering the operation of the system, it may be assumed that the doctor who is assigned the identification number 165 enters the hospital through the lobby and proceeds directly to the twenty-first floor, where he will be occupied for a considerable period of time. Upon entering the hospital the doctor, conforming to hospital regulations, actuates the "in" key 165g to its off-normal position, thereby to complete an obvious circuit for energizing the two pilot lamps 165e and 165f in parallel. Branches of this circuit extend to the pilot lamps individual to the doctor No. 165 and provided on each of the other display boards. The energization of these particular pilot lamps provides an indication at all of the display boards, and at the lamp panel of the lobby station 10, that the doctor No. 165, whose name appears opposite each of these lamps, is in the hospital but is not available for consultation.

If the doctor No. 165, upon proceeding to the twenty-first floor of the hospital, desires to place himself on call, he may do so by actuating the transmitting device at one of the control stations on this floor, to transmit the digits of his identification number to the associated floor switch 21. Assuming that the station A is selected for this purpose, the doctor, before starting the dialing operation, operates the hold key 104a to its off-normal position, thereby to complete an obvious circuit for energizing in parallel the pilot lamps 105a, 105b, 105c, etc., at the various control stations on the twenty-first floor. The energization of these lamps serves to provide an indication that the twenty-first floor switch 21 is busy. When the key 104a is actuated to its off-normal position, a circuit including the series-connected pulsing springs of the transmitting devies 101 is also completed for energizing the pulsing relay R110. This relay, in operating, closes its contacts 111 to complete an obvious circuit for energizing the hold relay R120. The relay R120, upon operating, closes its contacts 122 to prepare a pulsing circuit having three branches which extend to the rotary magnet 160, the vertical magnet 161 and the operating magnet 203 of the minor switch 200, respectively. At its contacts 123, the relay R120 opens a point in the common portion of the operating circuits for the release magnets 162 and 204. At its contacts 121, the relay R120 prepares locking circuits for the transfer relays R140 and R150, and the reset relay R250.

When the first digit "1" is dialed through operation of the transmitting device 101a provided at the station A, the shunt springs 103 are moved into engagement to complete an obvious path in shunt with the engaged contacts of the key 104, and the pulsing springs 102 are opened and closed to transmit an impulse to the relay R110. This relay, upon restoring at the beginning of the open-circuit period of the impulse, opens its contacts 111 to interrupt the operating circuit for the hold relay R120, and closes its contacts 112 to complete the prepared circuit for energizing the transfer relay R130 in series with the operating magnet 203 of the minor switch 200. The latter circuit extends from ground by way of the contacts 112, 122 and 163b, the winding of R130, the contacts 153, and the winding of the magnet 203 to battery. When thus energized the relay R130 operates and closes its contacts 133 to prepare an alternative pulsing circuit which by-passes the off-normal contacts 163b and includes the off-normal contacts 163a. At its contacts 132, the relay R130 opens a point in the circuit for transmitting current pulses to the rotary magnet 160 and the start relay R210 in series. At its contacts 131, the relay R130 completes a circuit, including the contacts 151, for energizing the transfer relay R140. The relay R140 now operates and closes its contacts 141 to complete a path for short-circuiting the winding of the transfer relay R150, this path extending from ground by way of the contacts 121, the winding of R150, and the contacts 141, 151 and 131 back to ground. Thus the transfer relay R150 is prevented from operating until the transfer relay R130 subsequently restores.

When energized in series with the transfer relay R130, the magnet 203 operating in conjunction with its associated ratchet and pawl mechanism, functions to advance the wipers 201 and 202 one step from the illustrated normal positions thereof, into engagement with their respective associated second contacts. In the present case, this operation of the switch wipers 201 and 202 is without effect. Incident to the off-normal movement of the wipers 201 and 202, the off-normal springs 205 are operated into engagement further to prepare the above-mentioned operating circuit for the release magnet 204.

When the pulsing relay R110 reoperates at the end of the single open-circuit pulse of the first digit, it recloses its contacts 111 to again energize the hold relay R120, and opens its contacts 112 to deenergize the transfer relay R130 and the magnet 203. Due to its slow-to-release characteristic, the hold relay R120 remains operated during impulsing. The transfer relay R130 restores shortly after the end of the digit and opens its contacts 131 to interrupt the above-traced path short-circuiting the winding of the transfer relay R150. The latter relay is now energized in series with the transfer relay R140, over a circuit which extends from ground by way of the contacts 121, the winding of R150, the contacts 141 and the winding of R140 to battery. When thus energized the transfer relay R150 operates and opens its contacts 151 further to interrupt the above-traced short-circuiting path. At its contacts 153, the relay R150 opens another point in the above-traced circuit for delivering current pulses to the magnet 203. At its contacts 152, the relay R150 prepares a circuit for delivering current pulses to the winding of the vertical magnet 161 through the winding of the transfer relay R130, during the dialing of the second digit. It is noted that the current supplied to the winding of the transfer relay R140 through the winding of the transfer relay R150, following the release of the transfer relay R130, is sufficient to maintain the relay R140 operated.

When the second digit "6" of the doctor's identification number 165 is dialed at the station A, the pulsing springs 102 are opened and closed six times, so that six impulses are transmitted to the pulsing relay R110. This relay functions to repeat the pulses to the transfer relay R130 and the vertical magnet 161 over a circuit which initially extends from ground by way of the contacts 112, 122 and 163b, the winding of R130, the contacts 152, and the winding of the magnet 161 to battery. When first energized in this circuit, the relay R130 closes its contacts 133 to again prepare the path for by-passing the off-normal contacts 163b in the pulsing circuit, and opens its contacts 132 to prevent current pulses from being delivered to the start relay R210 and the rotary magnet 160 in series. Due to the slow-to-release characteristics thereof, the hold relay R120 and the transfer relay R130 remain operated throughout the second digit and until shortly after the digit is ended.

Each time the vertical magnet 161 is energized in the above-traced pulsing circuit, it operates in conjunction with its associated ratchet and pawl mechanism to elevate the wiper carriage structure one step, so that at the end of the digit the wipers 275 to 278, inclusive, are left standing opposite the sixth level of bank contacts. Incident to the first vertical step of the wiper carriage structure, the off-normal springs 164 are moved into engagement further to prepare the operating circuit for the release magnet 162, the off-normal contacts 163b are moved out of engagement and the off-normal contacts 163a are moved into engagement. Thus the by-pass path in shunt with the off-normal contacts 163b is established, so that the second to sixth current pulses are transmitted through the winding of the transfer relay R130 to the vertical magnet 161, over a circuit which extends from ground by way of the contacts 112, 122, 163a and 133, the winding of R130, the contacts 152 and the winding of the magnet 161 to battery.

Shortly following the end of the second digit, and during the inter-digit pause between this digit and the third or final digit, the transfer relay R130 restores. In releasing, this relay opens its contacts 133 so that no further current pulses may be transmitted to the vertical magnet 161 in response to further operation of the pulsing relay R110. At its contacts 132, the relay R130 prepares the above-mentioned circuit for transmitting current pulses to the series connected start relay R210 and rotary magnet 160.

When the third digit "5" of the doctor's identification number is dialed at the station A, the pulsing springs 102 are opened and closed five times, so that five impulses are transmitted to the pulsing relay R110. This relay, in following the impulses, functions to transmit a corresponding number of current pulses over the above-mentioned circuit to the start relay and the rotary magnet 160. This circuit may now be traced as extending from ground by way of the contacts 112, 122, 163a and 132, the winding of R210 and the winding of the magnet 160 to battery. When first energized over this circuit, the relay R210 operates and opens its contacts 211 to interrupt the common portion of the incomplete circuits for energizing the magnet 283 and the relays R220 and R240. Due to its slow-to-release characteristic, the relay R210 remains operated throughout the third digit and until shortly after the digit is ended. Each time the rotary magnet is energized in the above-traced pulsing circuit, it operates in conjunction with its associated ratchet and pawl mechanism to rotate the wiper carriage structure one step, so that at the end of the third digit the wipers 275 to 278, inclusive, are left standing in engagement with the fifth contacts of the sixth level in the associated contact banks. Incident to the rotation of the wiper carriage structure to a rotary off-normal position, the rotary off-normal springs 265 are moved into engagement to prepare the above-mentioned circuits for energizing the magnet 283 and the relays R220 and R240.

At the end of the third and final digit, the pulsing relay R110 remains in its operated position so that the start relay R210 and the rotary magnet 160 are deenergized. Shortly after the digit is ended, the relay R210 restores and closes its contacts 211 to complete the prepared circuit for energizing the relay R240. This circuit extends from ground by way of the contacts 211, the off-normal springs 265, the contacts 221 and the winding of R240 to battery. In operating, the relay R240 closes its contacts 241 to complete a multiple locking circuit for the transfer relays R140 and R150 and to prepare a locking circuit for the reset relay R250. At its contacts 242, the relay R240 opens another point in the operating circuit for the release magnet 162. At its contacts 243, the relay R240 opens another point in the operating circuit for the release magnet 264. At its contacts 244, the relay R240 completes a locking circuit for the pulsing relay R110, this circuit extending from ground by way of the contacts 244, the series-connected pulsing springs of the transmitting devices 101, and the winding of R110 to battery. The purpose of providing this locking circuit is to prevent the premature release of the floor switch 21 in the event the doctor using the station A restores the hold key 104a to normal immediately the dialing operation is completed and without waiting for the actual change in the displayed indications to occur. In other words, after the key 104a is restored to normal, the switch is held operated under the control of the release relay R240.

The start relay R210, in releasing, also completes a circuit including the off-normal springs 265 and the contacts 221, for energizing the operating magnet 283 of the register control switch 280. When thus energized the magnet 283 opens its contacts 285 further to interrupt the prepared operating circuit for the stepping relay R230, and conditions its associated ratchet and pawl mechanism to step the wipers 281 and 282 from their illustrated normal positions into engagement with their respective associated second contacts. In restoring, the start relay R210 also completes a circuit including the contacts 211 and the off-normal springs 265, for energizing the slow-to-operate start cut-off relay R220. This relay, in operating, opens its contacts 221 to deenergize the magnet 283 and to interrupt the above-traced operating circuit for the release relay R240. When the magnet 283 is thus deenergized, its associated operating pawl is retracted to advance the wipers 281 and 282 into engagement with their respective associated second contacts. At its contacts 285, the magnet 283 completes the prepared operating circuit for the stepping relay R230, this circuit extending from ground by way of the wiper 282 and its engaged second contact, the contacts 285, and the winding of R230 to battery. When thus energized the relay R230 closes its contacts 231 to energize the release relay R240 and the magnet 283 in parallel over an obvious circuit. The magnet 283 now reoperates and opens its contacts 285 to deenergize the stepping relay R230. The relay R230, in restoring, opens its contacts 231 to deenergize the magnet 283. Since the second to twenty-fifth contacts of the contact set associated with the wiper 282 are multipled together and connected to ground, the inter-related operation of the stepping relay R230 and the magnet 283 continues until the lower ends of the double-ended wipers 281 and 282 are operated to engage the respective first contacts of the associated contact banks, at which time the operating circuit for the stepping relay R230 is opened to prevent further operation of this relay and the magnet 283. As indicated by the foregoing explanation, a current pulse is transmitted to the release relay R240 each time the stepping relay R230 operates. Due to its slow-to-release characteristic, the release relay remains operated throughout the described cycle of operation of the register control switch 280.

During this cycle of operation of the register control switch 280, ten restoring pulses are transmitted to the operating magnets of the display registers in the display unit 26 and the corresponding display units of the other display boards. Thus when the stepping relay R230 first operates it closes its contacts 232 to prepare or complete a circuit for energizing one of the magnets 301a, 301b and 301c, individual to the registers 300a, 300b and 300c in the display unit 26. In this regard it is pointed out that when the indicating drum of any register 300 occupies its normal or blank position, the associated cam 304 occupies a position such that the commutator springs 302 are disengaged and the springs 303 are engaged. In all other positions of the indicating drum the cam 304 occupies a position such that the springs 302 are engaged and the springs 303 are disengaged. Accordingly, if the register 300c, for example, of the display unit 26, is assumed to occupy its sixth off-normal position at the time the cycle of operation of the register control switch 280 under consideration is initiated, five restoring pulses will be transmitted to the magnet 301c during the first ten steps of the switch wipers 281 and 282. The circuit over which these pulses are delivered to the magnet 301c extends from ground by way of the contacts 232, the wiper 281, the multipled second to eleventh contacts of the contact set associated with this wiper, the contacts 273, the wiper 277, the contacts 165b, the winding of the magnet 301c, and the contacts 302c to battery. Each time the magnet 301c is thus energized it advances its associated indicating drum one step. Five such steps are required to advance the indicator drum to its normal or blank position, at which time the cam 304c operates to open the commutating contacts 302c and to close the commutating contacts 303c. At the contacts 302c, the above-traced pulsing circuit is interrupted, thus preventing the remaining five restoring pulses of the train from producing further operation of the magnet 301c. In a manner similar to that just described, five of the ten transmitted restoring pulses are utilized to normalize the registers of the other display boards which correspond to the register 300c of the illustrated display board 25. It will be understood that had the register 300c and the corresponding registers of the other display boards occupied their respective second off-normal positions, for example, nine pulses of the restoring train would have been utilized to advance the indicator drums of these registers to their respective normal or blank positions. The pulses of the restoring train are also transmitted to the magnets 301a and 301b of the registers 300a and 300b and to the magnets of the corresponding registers in the other display boards, but under the conditions assumed the indicator drums of these registers all occupy their normal or blank positions wherein the commutator springs 302 thereof are disengaged. Accordingly, the restoring pulses are ineffective to produce operation of these magnets. It will also be understood from the above explanation that after a maximum of ten restoring pulses have been transmitted to the magnets of the selected display units, all of the indicator drums of the registers in these units stand in their normal or blank positions.

After the train of ten restoring pulses has been counted by the register control switch 280, the wipers 281 and 282 of this switch are operated to engage their respective associated twelfth contacts. With the wiper 281 in this position the stepping relay R230, upon next operating to energize the magnet 283, completes a circuit for energizing the reset relay R250. This circuit extends from ground by way of the contacts 232, the wiper 281 and its engaged twelfth contact, the contacts 262 and the winding of R250 to battery. In operating, the reset relay R250 locks to ground over a path including the contacts 252 and the contacts 241 and 121 in parallel. At its contacts 251, the relay R250 connects the commutator contacts 303a of the registers 300a, and the corresponding commutator contacts of the corresponding registers individual to the doctor No. 165, to the negative terminal of the current source, thereby to prepare circuits for resetting these registers. These circuits are further prepared when the wipers 281 and 282 of the register control switch 280 are stepped to engage their associated thirteenth contacts. With the wiper 281 in the last-mentioned position, the indicated circuits are completed when the stepping relay R230 next operates. Thus a circuit for energizing the magnet 301a of the register 300a may be traced as extending from ground by way of the contacts 232, the wiper 281 and its engaged thirteenth contact, the contacts 273, the wiper 277 and its engaged contact 165b, the winding of the magnet 301a, the contacts 302a, the contact 165a, the wiper 275, and the contacts 271, 261 and 251 to battery. Corresponding circuits are completed for energizing the magnets of the registers of the other display boards which correspond to the register 300a of the board 25. When these circuits are completed the indicator drums of the selected registers are advanced one step to display the indication 21. Thus when the magnet 301a is energized, it operates in conjunction with its associated ratchet and pawl mechanism to advance the indicator drum of the register 300a one step, wherein the numeral 21 is displayed through the window thereof. Incident to this movement the cam 304a is operated to an off-normal position wherein the contacts 303a are disengaged and the contacts 302a are moved into engagement. Thus the initially completed reset pulse circuit is opened and an alternative circuit is prepared for energizing the magnet 301a during continued operation of the register control switch 280. In a similar manner, the commutating contacts of the registers in the other display boards which correspond to the register 300a, are shifted to provide a more direct circuit for energizing the operating magnets thereof.

In the present case, wherein the switch 21 and the calling control station A are located on the twenty-first floor, only a single reset pulse is transmitted to each of the selected registers. Thus it will be noted that the fourteenth to twenty-fifth contacts of the contact set associated with the wiper 281 are not wired. Accordingly, when this wiper is moved out of engagement with its associated thirteenth contact, no further circuit is available for transmitting reset pulses to the operating magnets of the selected registers. In this regard it is pointed out that the wiring of the contact set associated with the wiper 281 in the register control switch of each automatic floor switch determines the number of reset pulses which are transmitted during each cycle of operation thereof. Thus, had the switch illustrated been provided on the twenty-fifth floor, for example, the fourteenth to eighteenth contacts of the contact set associated with the wiper 281 would have been multipled together to provide a circuit for transmitting five reset pulses to the registers of any selected display units. Similarly, had the switch 21 been provided on the twenty-eighth floor, the fourteenth to twenty-first contacts of the contact set associated with the wiper 281 would have been multipled together to provide a circuit for transmitting eight reset pulses during each cycle of operation of the control switch 280. In the last-mentioned case, the second to eighth pulses of the reset train would have been transmitted to the magnet 301a of the register 300, for example, over a circuit which extends from ground by way of the contacts 232, the wiper 281, the contacts 273, the wiper 277, the contact 165b, the winding of the magnet 300a, and the contacts 302a to battery. Thus it will be noted that after the first reset pulse is transmitted to the magnet 301a, for example, the commutator contacts 303a and the wiper 275 are by-passed in the reset pulse circuit. From a consideration of the registers 300b and 300c it will be noted that this is a feature common to all of the registers.

In the present case, the selected registers are all reset to display the numeral 21 after a single reset pulse is transmitted thereto. This numeral identifies the floor where the doctor No. 165 may be located. After this single reset pulse is transmitted, the step-by-step operation of the register control switch 280 continues until the cycle of operation thereof is completed, at which time the operating circuit for the stepping relay R230 is opened in the manner explained above. With this relay in its restored position, the release relay R240 is deenergized and restores after an interval. In releasing, the relay R240 opens its contacts 244 to deenergize the pilot lamps 105 and the pulsing relay R110. At its contacts 242, the relay R240 reprepares the operating circuit for the release magnet 162. At its contacts 243, the relay R240 reprepares the operating circuit for the release magnet 204. At its contacts 241, the relay R240 opens one of the multiple locking circuits for the relays R140, R150 and R250. The relay R110, upon restoring, closes its contacts 112 further to prepare the operating circuits for the release magnets 162 and 204, and opens its contacts 111 to deenergize the hold relay R120. The relay R120 now restores and opens its contacts 121 to deenergize the relays R140, R150 and R250. At its contacts 123, the relay R120 completes the prepared operating circuit for the release magnet 162, this circuit extending from ground by way of the contacts 112 and 123, the off-normal springs 164, the contacts 242, and the winding of the release magnet 162 to battery. At its contacts 123, the relay R120 also completes the prepared operating circuit for the release magnet 204, this circuit extending from ground by way of the contacts 112, 123 and 243, the off-normal springs 205, and the winding of the magnet 204 to battery. When thus energized the release magnet 204 attracts its holding pawl to permit the wipers 201 and 202 to be restored to normal, in a manner well understood in the art. Incident to the normalizing of these wipers the off-normal springs 205 are disengaged to deenergize the release magnet 204. The magnet 162, when energized in the circuit traced above, attracts its associated holding pawl to permit the wipers 275 to 278, inclusive, to be restored to rotary and vertical normal, in the usual manner. Incident to the restoration of these wipers to their respective normal positions, the off-normal springs 164 are opened to deenergize the release magnet 162, the off-normal springs 163a are opened, the off-normal springs 163b are closed, and the rotary off-normal springs 265 are opened to deenergize the start cut-off relay R220. Following the release of the relay R220 the automatic floor switch 21 is fully restored to normal and is conditioned for further use.

If, after making routine calls or discharging other duties on the twenty-first floor of the hospital, the doctor No. 165 proceeds to the eleventh floor, for example, he may, by again dialing his identification number at one of the eleventh floor control stations, wipe out the numeral twenty-one as displayed by the register 300a and the corresponding registers of the other display boards, and reset the display units assigned for his use to display an indication eleven, which shows that he may be located on the eleventh floor of the hospital. In this regard it will be noted that, incident to the operation of the eleventh floor switch 11, the wipers of this switch are positioned on the sixty-fifth contacts of their associated contact banks, in a manner clearly apparent from the above explanation with reference to the operation of the switch 21. Moreover, immediately after the third digit "5" is dialed at the calling eleventh floor control station, the register control switch embodied in the automatic floor switch 11 starts a cycle of operation so that ten restoring pulses are transmitted over a circuit which includes the wiper 292 and its engaged contact 165d to the operating magnets 301a, 301b and 301c of the registers 300, and to the operating magnets of the corresponding registers in each of the other display boards. Thus the indicating elements of the register 300a and the corresponding registers of the other display boards are restored to their respective normal or blank positions. After the existing display has been wiped out in this manner, the register control switch of the floor switch 11 operates to transmit a single reset pulse over a circuit which includes the wipers 291 and 292 and their respective engaged contacts 165c and 165d, to energize the operating magnet 301b of the register 300b and the operating magnets of the corresponding registers in the other display boards. Thus the indicator drum of the register 300b is advanced to display the numeral eleven.

The corresponding registers of the other display boards are similarly advanced to display the numeral eleven, indicating that the doctor No. 165 may be located on the eleventh floor of the hospital. The manner in which the floor switch 11 is automatically released is exactly the same as described above with reference to the automatic floor switch 21. It will be understood from the above explanation that as the doctor No. 165 proceeds from floor to floor of the hospital he may, by dialing his identification number at a control station on each floor, reset the display units provided for his use so that accurate information is at all times given as to his location.

If the doctor No. 165 proceeds to a ward or floor where he will be occupied with duties from which he does not wish to be disturbed, he may wipe out the indications displayed by the display units provided for his use, without resetting these units to provide a new floor indication. For example, the doctor may be occupied with duties in Surgery, in which case he will not wish to be disturbed. In order to wipe out the existing indications displayed by the units provided for his use, the doctor No. 165 may dial the number 665 at any one of the control stations provided in the hospital. Assuming that this number is dialed at the control station A, for example, the twenty-first floor switch 21 is utilized in wiping out the existing indication. In this case the wipers 201 and 202 of the minor switch 299 are positioned to engage their associated seventh contacts at the end of the first digit of six impulses dialed at the station A. With the wiper 201 in this position, an obvious circuit is completed for energizing the clear out relay R260. Aside from the operation of the relay R260, the manner in which the switch 21 operates is exactly the same as described above. From this explanation it will be recalled that incident to the cycle of operation of the register control switch 280, which occurs at the end of the third digit dialed at the station A, a train of ten restoring pulses is transmitted to the registers 300 of the display unit 26 and the registers of the corresponding display units in the other boards. Thus the registers of these units which display indications are restored to their normal or blank positions. With the relay R260 operated the circuit for energizing the reset relay R250 is held open at the contacts 262 throughout the cycle of operation of the register control switch 280. Also, the reset pulse circuit, which is utilized in the transmission of the first reset pulse in the manner explained above, is held open at the contacts 261 of the operated clear out relay R260. Accordingly, no reset pulses are transmitted to the operation magnets of the selected registers during the reset portion of the operating cycle of the register control switch 280. Thus no new indications are posted in the display units individual to the doctor No. 165. After the cycle of operation of the register control switch 280 is completed, the automatic floor switch 21 is released in the manner described above. Incident to the release of this switch, and when the minor switch 200 embodied therein is restored to normal, the clear out relay R260 is deenergized and restores. Otherwise the release of the switch 21 is effected in the exact manner described above.

If a doctor, in attempting to change or wipe out the indications displayed by the display units provided for his use, proceeds to dial his identification number at one of the control stations without first operating the hold key provided at this station, the automatic floor switch associated with the control station in use is released at the end of each digit and the pilot lamp at the control station in use is intermittently energized as the digits are dialed. Thus if the calling device 101a provided at the station A is actuated before the hold key 104a is operated to its off-normal position, the shunt springs 103 are closed as the dial of the transmitting device 101a is moved off normal and are opened when this dial is returned to its normal position. During the period when the contact springs 103 are engaged, the pilot lamps 105 and the relays R110 and R120 are energized in the manner previously explained. The transfer relays R130, R140 and R150 are operated during the dialing operation in progress. Also, the wipers of the minor switch 200 may be moved off normal under the control of the magnet 203 through operation of the pulsing springs 102, during the period when the off-normal springs 103 are closed. When, however, these off-normal springs are opened at the end of the digit, the lamps 105 and the relays R110, R120, R130, R140 and R150 are all deenergized and restore. Incident to the release of the relays R110 and R120, the operating circuit for the release magnet 204 is completed, whereby the minor switch 200 is released in the manner explained above. Thus the twenty-first floor switch 21 is fully restored and the pilot lamps 105 are deenergized immediately after the first digit is dialed at the station A. Each time the transmitting device 101a is actuated the operations just described are repeated, so that the pilot lamps 105 are intermittently energized. The flashing of the lamp 105a provided at the calling control station A serves to inform the doctor using this station that the key 104a should be actuated and the dialing operation repeated.

Each time a doctor leaves the hospital he is expected to comply with hospital regulations by operating his assigned "out" key at the lobby station 10 for the purpose of wiping out the pilot indications which may be displayed by the display units provided for his use on the display boards. Thus if the doctor No. 165, for example, leaves the hospital, he is expected to actuate the "out" key 165h when he passes the lobby station 10. When the key 165h is operated to its off-normal position, the mechanical inter-lock mechanism between this key and the "in" key 165g is operated to restore the key 165g to normal so that the contacts thereof are disengaged. When these contacts are opened the pilot lamp 165e and the pilot lamps 165f individual to the display units provided for the use of the doctor No. 165, are deenergized to produce an indication that the doctor No. 165 is no longer on the premises.

The manner in which the other doctors attached to the staff of the hospital, and for whose use display units are provided on the display boards, may control the display units individual thereto from the lobby station 10, or any one of the control stations of the system, will readily be apparent from the preceding explanation. In this regard, it is pointed out that, for selecting purposes, the display units are divided into two groups of one hundred sets each. With this arrangement, when the wipers of the Strowger switching mechanism embodied in any one of the automatic floor switches is operated to any particular position, two sets of display units individual to two different doctors are selected. In order to determine which of the two selected sets of units is to be controlled, a wiper switching relay is provided in each of the automatic floor switches. Thus the twenty-first floor switch 21 includes a switching relay R270 which is controlled in accordance with the position of the wipers of the minor switch 200 at the end of a first digit transmitted to the switch. With this arrangement, if the doctor No. 265, for example, operates the transmitting device 191a to transmit the three digits of his identification number to the associated floor switch 21, the wipers of the minor switch 200 are positioned to engage their associated third contacts at the end of the first digit of two impulses. Immediately the wiper 202 engages its associated third contact an obvious circuit is completed for energizing the switching relay R270. This relay, in operating, opens its contacts 271 and 273 to interrupt the previously described circuits, over which the registers individual to the doctor No. 165 are controlled. At its contacts 272 and 274, the relay R270 prepares circuits extending through the wipers 276 and 278, over which the relays individual to the calling doctor No. 265 may be controlled in a manner clearly apparent from the preceding explanation. Aside from the operation of the switching relay R270, the wipe out of the indications displayed by the display unit 27 and the corresponding units of the other display boards, and the resetting of these units to display the numeral twenty-one, is effected in the exact manner described above. In this regard it will be noted that the switching relay R270 is deenergized and restores in response to the release of the minor switch 200 during the release of the floor switch 21.

In the event a doctor, such, for example, as the doctor No. 265, having display units in the second group, desires to wipe out indications displayed by these units, without resetting the units to display new indications, a first digit comprising seven impulses is dialed at the control switch from which the wipe out is effected. Assuming that the station A is used by the doctor No. 265 for this purpose, the wipers 201 and 202 are operated to engage their associated eighth contacts after the first digit of seven impulses is dialed at the station A. With the wiper 201 engaging its associated seventh contact, the clear out relay R260 is operated to maintain the reset pulse circuits open, in the manner previously described. With the wiper 202 engaging its associated eighth contact, the wiper switching relay R270 is energized so that the circuits for controlling the registers individual to the doctor No. 165 are held open at the contacts 271 and 273, and the circuits for controlling the registers individual to the doctor No. 265 are prepared at the contacts 272 and 274. Thus it will be apparent that with the wipers 276 and 278 engaging the contacts 265a and 265b and the two relays R260 and R270 operated, the indications displayed by the units individual to the doctor No. 265 will be wiped out and no new indications will be set up therein incident to the operation of the register control switch 280.

Although the invention has been explained with reference to a system for indicating the location of doctors attached to the staff of a large hospital, it will be understood that the system may also be used in industrial and other organizations to indicate the location of other objects, both animate and inanimate, which may be located in zoned areas that are not necessarily different floors of a building. For example, the system may be utilized for indicating at one or more points, the different locations of the executives and department heads of a large industrial organization having buildings disposed at random within a confined area. In such case the master or lobby station may be located at the gate-house or entrance zone of the area. As a further example, the system may be used to indicate the location of loaded inter-departmental trucks which are used in an industrial organization and are moved from place to place to meet production or other manufacturing requirements. In order generically to designate the persons or movable objects, the locations of which are to be indicated, such persons or objects have been termed "subjects" in the following portion of the specification.

While there has been described what is at present considered to be the preferred embodiment of the invention, it will be understood that various modifications may be made therein, and it is contemplated to cover in the appended claims all such modifications as fall within the true spirit and scope of the invention.

What is claimed is:

1. In a system for indicating the location of a plurality of subjects which may be located in different zones of a plural zone area and which includes control stations individual to said zones, display registers individual to said subjects and each including a zone indicating element having a normal position and a plurality of off-normal positions wherein characters are displayed thereby which indicate the different zones, each of said registers including a pulse controlled magnet which is operative to drive the associated indicating element from any off-normal position to its normal position when a train of restoring pulses is transmitted thereto and to then drive the associated element to another off-normal position when a train of reset pulses is transmitted thereto, automatic selector switches individual to said zones and each controllable from the control station of the corresponding zone to select any one of said registers, means individually included in said switches for successively transmitting a train of restoring pulses and a train of reset pulses to the magnet of a selected register, means individually included in said switches and selectively controllable from said stations for limiting the operation of said last-named means to the transmission of restoring pulses only, and means also individually included in said switches for causing each train of reset pulses to identify, by the number of pulses thereof, the zone of the control station in which the associated switch is located.

2. In a system for indicating the location of a subject which may be located in any zone of a plural zone area and which includes control stations individual to said zones and each comprising a signal transmitting device, a display register including a zone indicating element having a normal position and a plurality of off-normal positions wherein characters are displayed thereby which indicate the different zones, said register including a pulse controlled magnet which is operative to drive said indicating element from any off-normal position to its normal position when a train of restoring pulses is transmitted thereto and to drive said indicating element to another off-normal position when a train of reset pulses is transmitted thereto, means controlled by a predetermined signal transmitted thereto from one of said stations for transmitting successively a train of restoring pulses and a train of reset pulses to said magnet, and means controlled by a different signal transmitted from said one station to said last-named means for limiting the operation of said last-named means to the transmission of said restoring pulses.

3. In a system for indicating the location of a plurality of subjects which may be located in different zones of a plural zone area and which includes control stations individual to said zones and each comprising a signal transmitting device, display registers individual to said subjects and each including a zone indicating element having a normal position and a plurality of off-normal positions wherein characters are displayed thereby which indicate the different zones, each of said registers including a pulse controlled magnet which is operative to drive the associated indicating element from any off-normal position to its normal position when a train of restoring pulses is transmitted thereto and to then drive the associated element to another off-normal position when a train of reset pulses is transmitted thereto, automatic selector switches individual to said zones and each operative to select any one of said registers in response to either of two signals of different character transmitted thereto from the control station of the corresponding zone, means individually included in said switches for successively transmitting a train of restoring pulses and a train of reset pulses to the magnet of a selected register, and means individually included in said switches and selectively controlled in accordance with the character of said signals for limiting the operation of said last-named means to the transmission of trains of restoring pulses.

4. In a system for indicating the location of a subject which may be located in any zone of a plural zone area and which includes control stations individual to said zones, a plurality of display registers each individual to said subject and to a group of said zones, each of said registers including a zone indicating element having a normal position and a plurality of off-normal positions wherein different zones of the corresponding group are displayed, means controllable from any of said stations for restoring any one of said indicator elements to its normal position, and means individual to said registers and controllable only from the control stations of the zones in the corresponding groups for resetting said elements to display new indications.

5. In a system for indicating the location of a subject which may be located in any zone of a plural zone area and which includes control stations individual to said zones, a plurality of display registers each individual to said subject and to a group of said zones, each of said registers including a zone indicating element having a normal position and a plurality of off-normal positions wherein different indications identifying the different zones of the corresponding group are displayed and a pulse controlled magnet which is operative to drive the associated element from any off-normal position to its normal position when restoring pulses are transmitted thereto and to drive the associated element from its normal position to a selected off-normal position when reset pulses are transmitted thereto, and means controllable from said stations and individual to said registers for concurrently transmitting trains of restoring pulses to said magnets and for then transmitting to the magnet of the corresponding register a train of reset pulses which identifies, by the number of pulses thereof, the zone in which said subject may be located.

6. In a system for indicating the location of a subject which may be located in any zone of a plural zone area and which includes control stations individual to said zones, a plurality of display registers each individual to said subject and to a group of said zones, each of said registers including a zone indicating element having a normal position and a plurality of off-normal positions wherein different indications identifying the different zones of the corresponding group are displayed and a pulse controlled magnet which is operative to drive the associated element from any off-normal position to its normal position when restoring pulses are transmitted thereto and to drive the associated element from its normal position to a selected off-normal position when reset pulses are transmitted thereto, automatic selector switches individual to said stations and said registers and each controllable from its associated station concurrently to transmit trains of restoring pulses to said magnets and to then transmit to the magnet of the associated register a train of reset pulses which identifies, by the number of pulses thereof, the zone in which the associated control station is located.

7. In a system for indicating the location of a plurality of subjects which may be located in different zones of a plural zone area, a display board including display units individual to said subjects and each operative to display an indication of the zone in which the corresponding subject may be located, a plurality of control stations each provided with a signal device, an automatic selector switch operative to select any one of said units and including means for wiping out an indication displayed by the selected unit, switch means at each of said stations for seizing said selector switch and for concurrently energizing said signal devices, means at each of said stations for directing said selector switch in its operation to select one of said units, and means controlled by said wipe out means for preventing said selector switch from releasing if said switch means is released before a display wipe out operation is completed and for maintaining said signal devices energized independently of said switch means until the display wipe out operation is fully completed.

8. In a system for indicating the location of a plurality of subjects which may be located in different zones of a plural zone area, a display board including display units individual to said subjects and each operative to display an indication of the zone in which the corresponding subject may be located, a plurality of control stations each provided with a signal device, an automatic selector switch operative to select any one of said units and including means for resetting the selected unit to display a new indication, switch means at each of said stations for seizing said selector switch and for concurrently energizing said signal devices, means at each of said stations for directing said selector switch in its operation to select any one of said units, and means controlled by said reset control means for preventing said selector switch from releasing if said switch means is released before the operation of said reset control means is completed and for maintaining said signal devices energized independently of said switch means until the operation of said reset control means is fully completed.

9. In a system for indicating the location of a plurality of subjects which may be located in different zones of a plural zone area, a display board including display registers individual to said subjects and each including an indicating element having a normal position and a plurality of off-normal positions wherein characters are displayed thereby which indicate the different zones, each of said registers including a pulse controlled magnet which is operative to drive the associated indicating element from any off-normal position to its normal position when a train of restoring pulses is transmitted thereto and to drive the associated indicating element from its normal position to an off-normal position when a train of resetting pulses is transmitted thereto, a plurality of control stations each provided with a signal device, an automatic selector switch operative to select any one of said registers and including means for successively transmitting a train of restoring pulses and a train of reset pulses to the magnet of the selected register, switch means at each of said stations for seizing said selector switch and for concurrently energizing said signal devices, means at each of said stations for directing said selector switch in its operation to select one of said registers, and means controlled by said pulse transmitting means for preventing said selector switch from releasing if said switch means is released before said train of reset pulses is completely transmitted to the selected register and for maintaining said signal devices energized independently of said switch means until the selected register is reset by the pulses of the reset pulse train.

10. In a system for indicating the location of a plurality of subjects which may be located in different zones of a plural zone area and which includes control stations individual to said zones, display registers individual to said subjects and each including a zone indicating element having a normal position and a plurality of off-normal positions wherein characters are displayed thereby which indicate the different zones, each of said registers including a pulse controlled magnet which is operative to drive the associated indicating element, automatic switching apparatus selectively controllable from any selected one of said stations to select any one of said registers and including means selectively controlled in accordance with the location of the selected station for first restoring the indicating element of the selected register to normal and for then automatically transmitting to the magnet of the selected register a train of pulses which identifies by the number of pulses thereof, the zone in which the selected station is located.

11. In a system for indicating the location of a plurality of subjects which may be located in different zones of a plural zone area and which includes control stations individual to said zones, display registers individual to said subjects and each including a zone indicating element having a normal position and a plurality of off-normal positions wherein characters are displayed thereby which indicate the different zones, each of said registers including a pulse controlled magnet which is operative to drive the associated indicating element, automatic switching apparatus selectively controllable from any selected one of said stations to select any one of said registers and including means selectively controlled in accordance with the location of the selected station for first restoring the indicating element of the selected register to normal and for then automatically transmitting to the magnet of the selected register a train of pulses which identifies by the number of pulses thereof, the zone in which the selected station is located, and means also included in said switching apparatus and controllable from the selected station for limiting the operation of said last-named means to the normalizing of the indicating element of the selected register.

12. In a system for indicating the location of a plurality of subjects which may be located in different zones of a plural zone area and which includes control stations individual to said zones, display registers individual to said subjects and each including a zone indicating element having a normal position and a plurality of off-normal positions wherein characters are displayed thereby which indicate the different zones, each of said registers including a pulse controlled magnet which is operative to drive the associated indicating element from any off-normal position to its normal position when a train of restoring pulses is transmitted thereto and to then drive the associated element to another off-normal position when a train of reset pulses is transmitted thereto, automatic switching apparatus controllable from any selected one of said stations to select any one of said registers and including means controlled in accordance with the location of the selected station for first transmitting a train of restoring pulses and then a train of reset pulses to the magnet of a selected register, and means also included in said switching apparatus for causing each train of reset pulses to identify, by the number of pulses thereof, the zone of the control station from which said apparatus is being controlled.

13. In a system for indicating the location of a plurality of subjects which may be located in different zones of a plural zone area and which includes control stations individual to said zones, display registers individual to said subjects and each including a zone indicating element having a normal position and a plurality of off-normal positions wherein characters are displayed thereby which indicate the different zones, each of said registers including a pulse controlled magnet which is operative to drive the associated indicating element from any off-normal position to its normal position when a train of restoring pulses is transmitted thereto and to then drive the associated element to another off-normal position when a train of reset pulses is transmitted thereto, automatic switching apparatus controllable from any selected one of said stations to select any one of said registers and including means controlled in accordance with the location of the selected station for first transmitting a train of restoring pulses and then a train of reset pulses to the magnet of a selected register, means also included in said switching apparatus for causing each train of reset pulses to identify, by the number of pulses thereof, the zone of the control station from which said apparatus is being controlled, and means also included in said switching apparatus and controllable from the selected station for limiting the operation of said impulse transmitting means to the transmission of restoring pulses.

ALFRED H. BELLIVEAU.